United States Patent [19]
Koch et al.

[11] 4,149,696
[45] Apr. 17, 1979

[54] CASTING OR INJECTION MOLDING OF MULTI-LAYERED SHOE SOLES

[75] Inventors: Friedrich Koch; Hartmut Wetjen, both of Achim, Fed. Rep. of Germany; Werner Klee, deceased, late of Achim, Fed. Rep. of Germany, by Elly M. A. Klee, Joerg W. Klee, Anja M. Klee, Ute A. Klee, joint heirs; Peter Rafalski, Achim, Fed. Rep. of Germany

[73] Assignee: Desma-Werke GmbH, Achim, Fed. Rep. of Germany

[21] Appl. No.: 848,423

[22] Filed: Nov. 3, 1977

[30] Foreign Application Priority Data

Nov. 3, 1976 [DE] Fed. Rep. of Germany ....... 2650398

[51] Int. Cl.² .................. B29C 9/00; B29F 1/00; B29H 3/14; B29H 5/12
[52] U.S. Cl. ....................... 249/83; 425/119; 425/129 S; 294/105
[58] Field of Search .............. 425/119, 129 S; 249/83, 249/105, 107

[56] References Cited

U.S. PATENT DOCUMENTS

| | | | |
|---|---|---|---|
| 3,305,895 | 2/1967 | Ludwig | 425/119 |
| 3,374,504 | 3/1968 | Ludwig | 425/119 |
| 3,376,608 | 4/1968 | Wilcox | 425/119 |
| 3,474,496 | 10/1969 | Klee | 425/119 |
| 3,510,914 | 5/1970 | Hujik | 425/119 X |
| 3,555,609 | 1/1971 | Chu et al. | 425/119 |
| 3,574,895 | 4/1971 | McIlvin | 425/119 |

FOREIGN PATENT DOCUMENTS

1454988 8/1966 France ..................... 425/119

*Primary Examiner*—J. Howard Flint, Jr.
*Attorney, Agent, or Firm*—Sughrue, Rothwell, Mion, Zinn and Macpeak

[57] ABSTRACT

The bottom or tread layer 18 of a shoe sole 17 is formed with a beaded flange 26 extending outwardly around its upper edge, which serves as a barrier against the incursion of the material of the upper sole layer 19 into the side face region 20 of the sole during the casting or moulding of the upper layer. The flange is subsequently removed to leave a clean separation line between the two sole layers.

11 Claims, 9 Drawing Figures

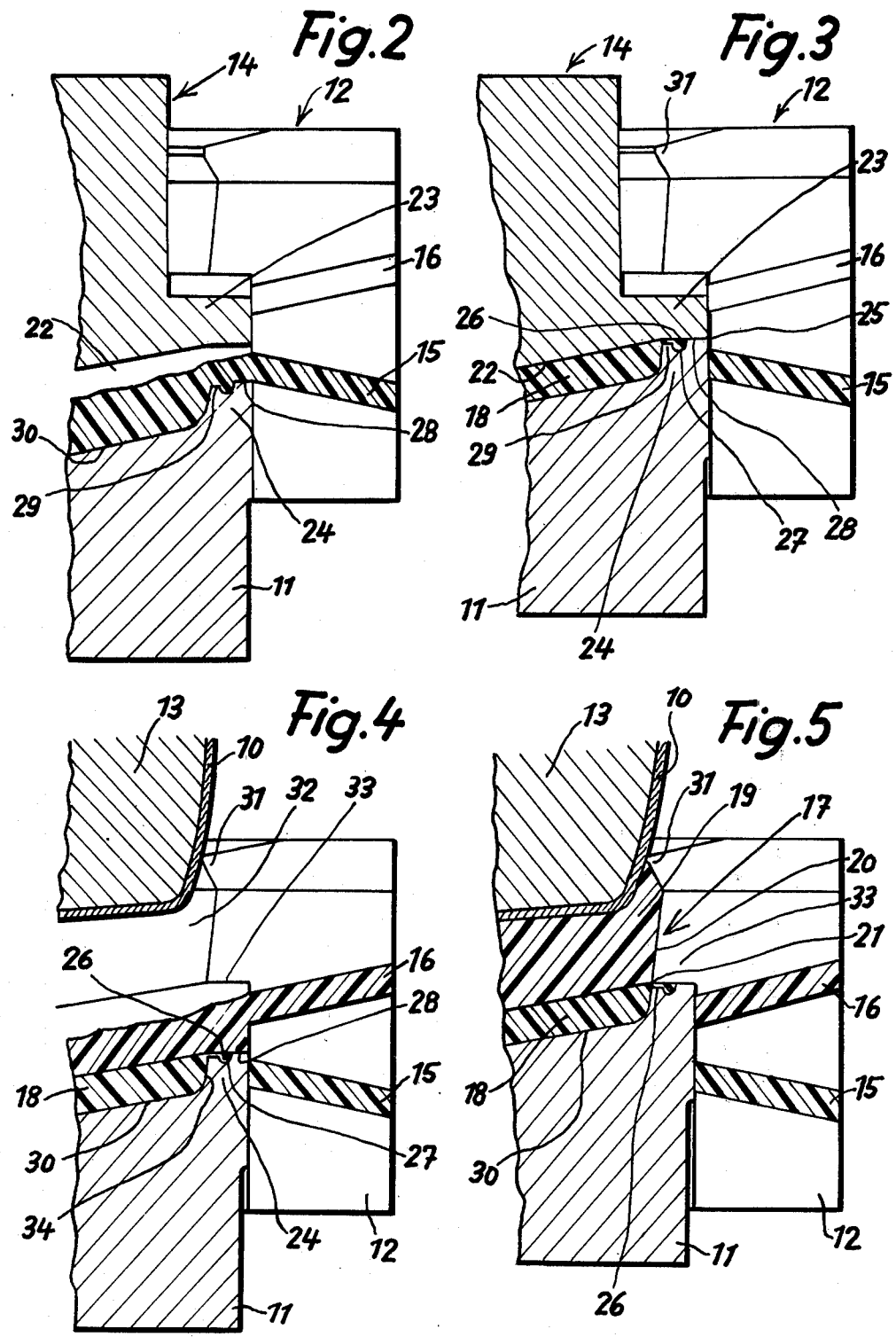

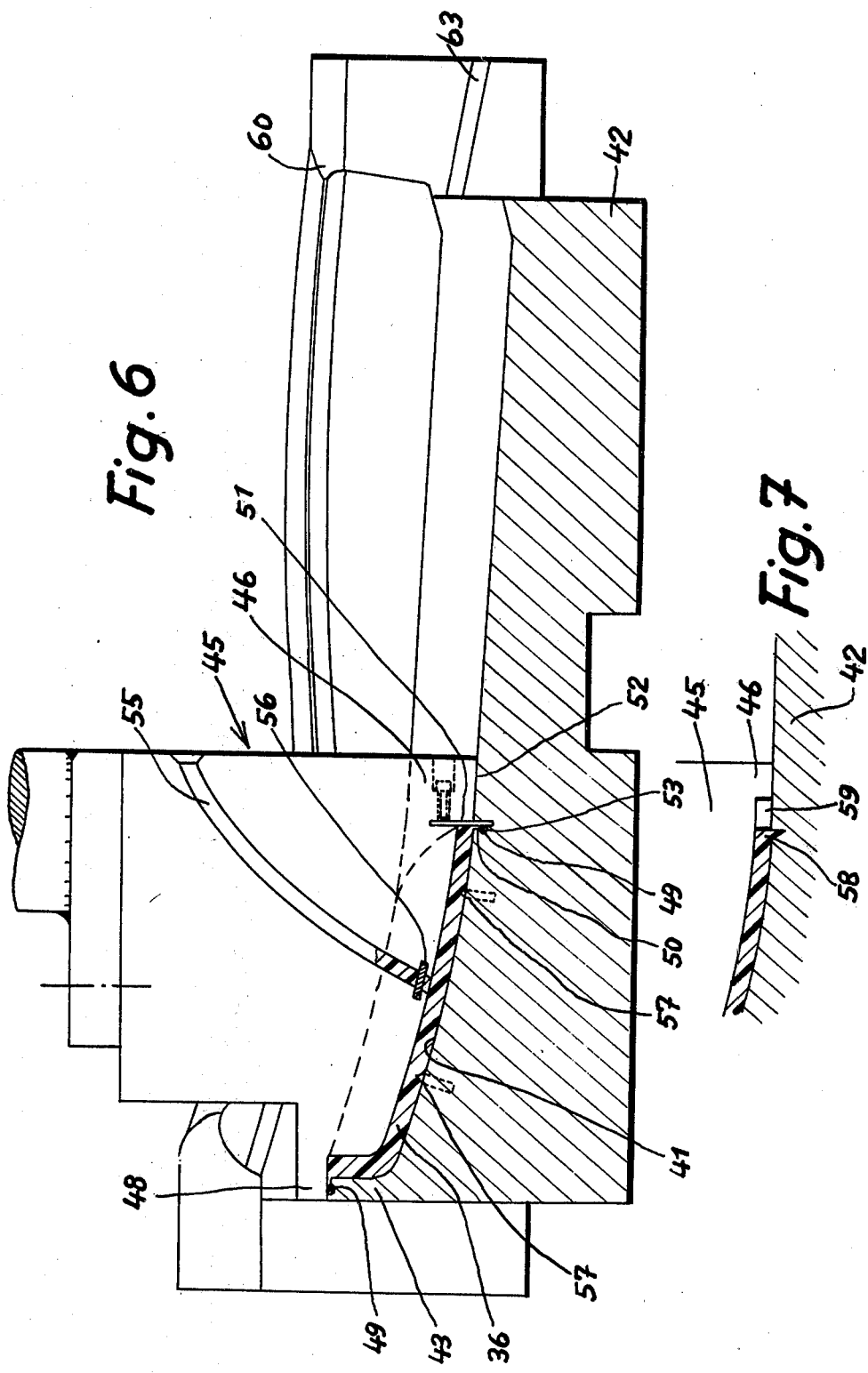

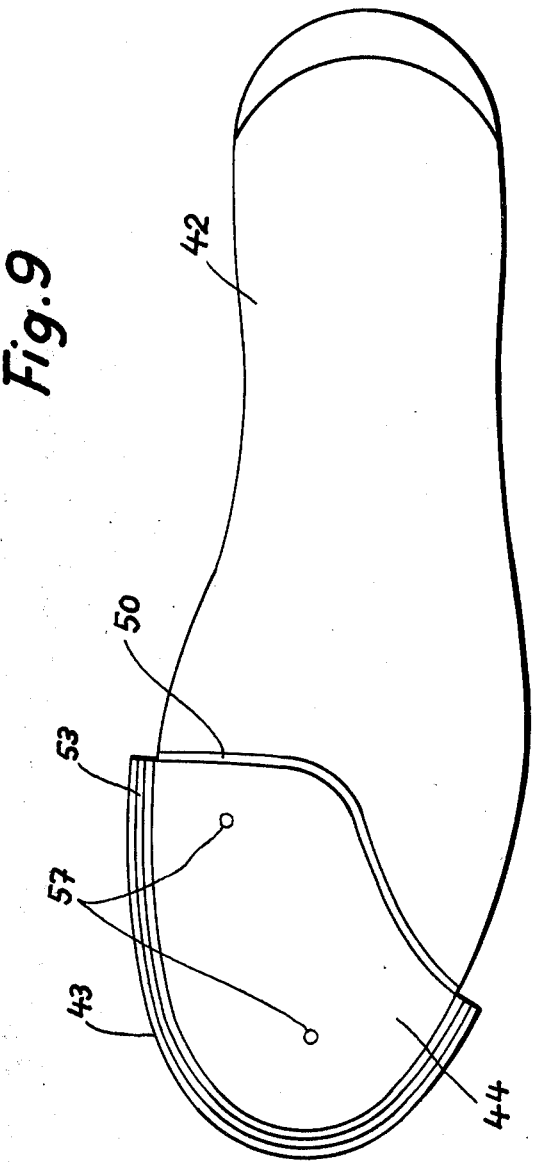

CASTING OR INJECTION MOLDING OF MULTI-LAYERED SHOE SOLES

BACKGROUND OF THE INVENTION

This invention relates to apparatuses for the casting or injection-moulding of footwear soles in two or more layers of polyurethane, preferably with simultaneous moulding to an upper of the footwear article, the sole parts being produced and connected with one another and if necessary with the footwear upper in successive casting of injection-moulding steps.

Various methods and apparatuses are known for the production of two-layer, two-colour shoe soles with simultaneous moulding to a shoe upper by casting or injection-moulding. According to German Patent Specification No. 2,022,118, a sole layer facing the shoe upper is moulded to the latter in a first injection-moulding action, and then, the outer sole layer forming the tread surface is moulded to the first layer.

Alternately, it is also known from German Patent Specification No. 2,241,493 to produce the sole layers in the converse sequence wherein the sole layer remote from the shoe upper is first produced, and then the sole layer extending between the layer and the upper is produced by casting and subsequent moulding.

In the above prior art the two-layer sole is in each case formed so that a drawn-down sole edge of the layer facing the shoe upper extends approximately to the plane of the tread surface. The side face of the outer or lower sole layer is thus completely covered by material of the intermediate sole layer. The side face of the sole thus imparts the impression of a one-piece and single colour configuration.

The invention is concerned with multi-part mouldings, especially shoe soles, in which the individual sole layers are not covered by one of the utilized materials but are deliberately and visibly defined from one another. A clear, unblurred and defect-free limitation of two sole parts, especially of different colours, is not however readily achievable in practice.

SUMMARY OF THE INVENTION

Accordingly, the invention is addressed to the problem of providing apparatuses by which multi-part shoe sole mouldings can be produced by casting or injection-moulding, with the different sole parts being limited from one another clearly and defect-free along a predetermined line of separation.

In this invention, on the surface of the sole in the region of the limit line between the sole parts a thin or film-like expulsion bead of material, at least of the first produced sole part and directed transverse to the surface, is formed during the casting or injection-moulding and is removed after the sole is withdrawn from the mould.

The invention is based on the recognition of the fact the imprecise separation lines between the different sole parts occur primarily due to the material of the first sole layer penetrating, as a result of high viscosity during the production of this first sole part, into that region of the mould in which a cavity is subsequently formed for the second sole part. Thus, residues of the material of the first sole part are clearly visible on the outer surfaces. By the deliberate expulsion of such material in accordance with the present invention, a transference of the material of the one sole part into the region of the other is avoided, and such expulsion bead acts as a barrier bridging the gap between the moulding and the mould wall.

The forming of the expulsion bead can be implemented by appropriately arranged and dimensioned joints between two adjacent mould parts, although it is also possible to form an expulsion bead at the requisite point of an otherwise continuous mould wall.

The casting or injection mould is formed in a special manner, whereby the bottom plunger of the mould is provided with an upwardly open recess into which the material for one sole part or layer can be poured. The recess is enclosed by a surrounding collar which at the same time limits the joint for the reception of expelled material.

BRIEF DESCRIPTION OF THE DRAWINGS

In the drawings:

FIG. 2 shows the heel zone of the mould according to FIG. 1 on an enlarged scale, during the casting of the first sole layer, FIG. 3 shows an illustration corresponding to FIG. 2 during the production of the first sole layer, FIG. 4 shows the mould zone of FIGS. 2 and 3 during the casting of a second sole layer, FIG. 5 shows the mould zone of FIGS. 2 to 4 during the moulding of the second sole layer, FIG. 6 shows a variant of the mould according to FIGS. 1 to 5 in longitudinal section during the production of a sole part in the toe area of the shoe, FIG. 7 shows a detail of the mould according to FIG. 6 with an alternative configuration, FIG. 9 shows the bottom plunger of the mould according to FIGS. 6 and 8 in plan view.

DETAILED DESCRIPTION OF THE PREFERRED EMBODIMENTS

Figure 1:
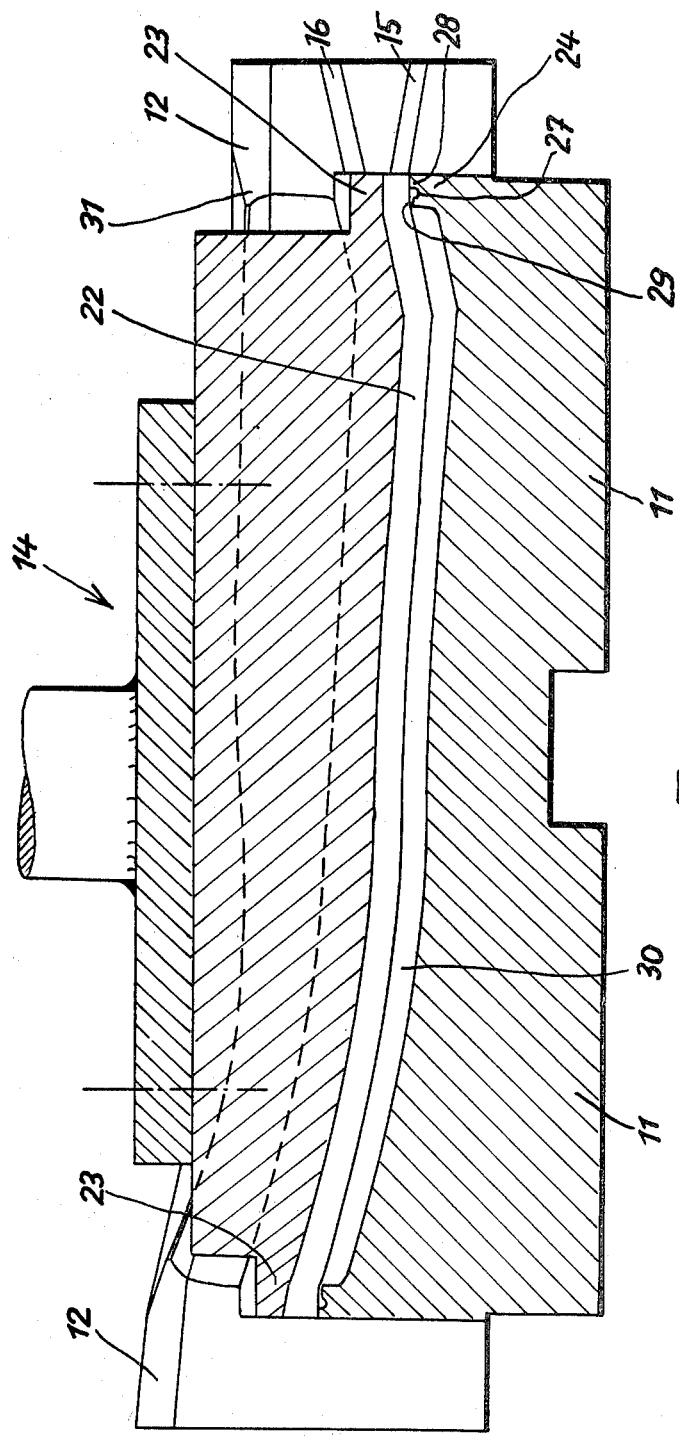
FIG. 1 shows a longitudinal section through a casting mould in a phase during the production of a first sole layer.
Figure 8:
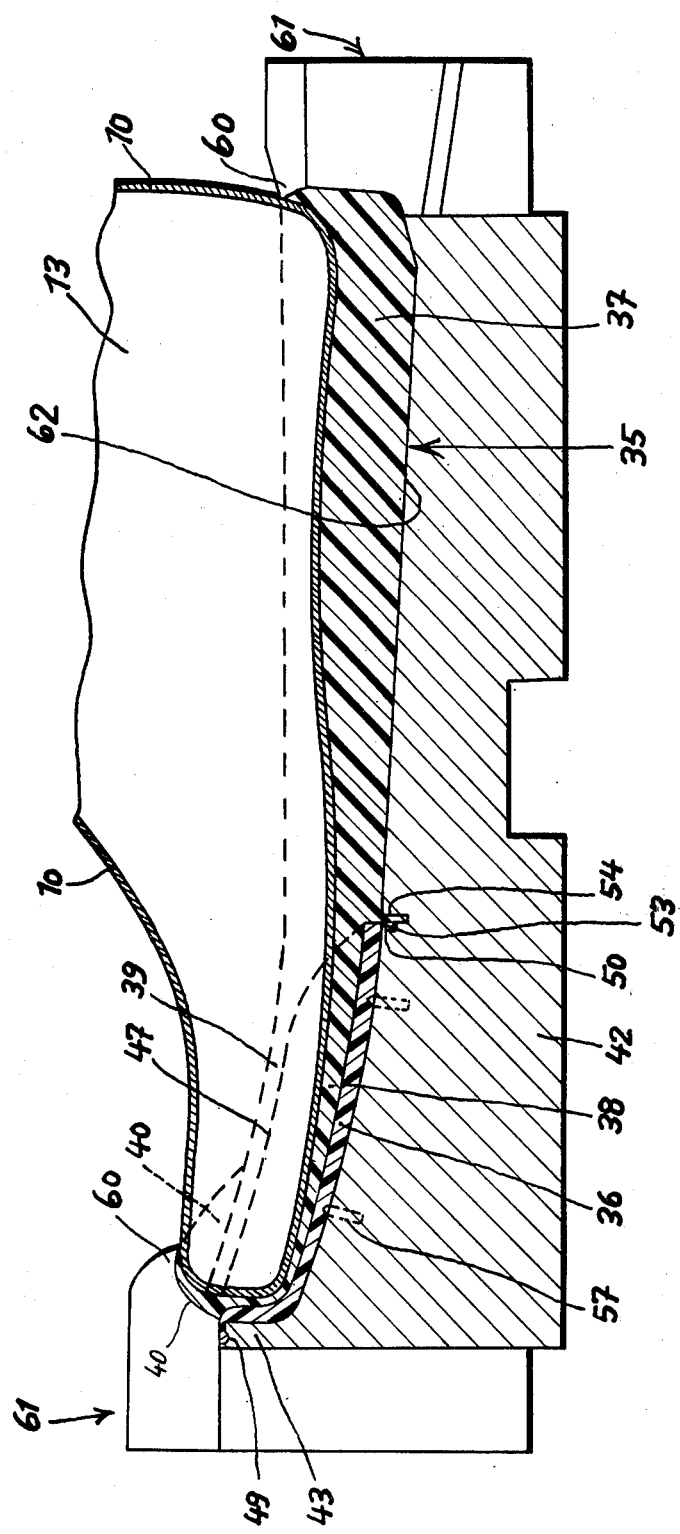
FIG. 8 shows the mould according to FIG. 6 during the production of the second sole part.

In the drawings, the embodiments shown are concerned with the production of two-part footwear soles with simultaneous moulding to a footwear upper 10. The soles are produced from castable material, such as polyurethane. For this purpose a mould is provided which, according to the embodiment in FIGS. 1 to 5, consists of a vertically displaceable bottom plunger 11, lateral mould parts 12, a last 13, and a mould counterpiece 14. The last 13 receives the shoe upper 10, which is produced separately. The lateral or members 12 are divided in the longitudinal central plane of the mould, and partly enclose the bottom plunger 11. For discharging the mould the two halves 12 are driven apart. Pouring passages 15 and 16 extend into the lateral mould parts 12 in the region of the central plane of separation, by way of which the two materials are introduced into corresponding mould cavities for the production of a two-part sole 17.

In FIGS. 1 to 5 the sole 17 consists of a first moulded outer sole layer 18 and a second sole layer 19 facing the shoe upper 10. The sole layers 18 and 19 are limited from one another along a separation line 21 in the zone of a lateral surface 20 of the sole, and are thus clearly visible.

In a position according to FIGS. 1 and 2 in which the last 13 is replaced by the suitably formed mould counterpiece 14, the material for the first sole layer 18 is introduced through passage 15 into a corresponding mould cavity 22. The counterpiece 14 enters the zone between the lateral mould parts 12 with a lower mould plate 23 shaped in conformity with the surface of the first sole layer 18, and limits the upper side of the mould cavity 22. The bottom plunger 11 is situated in a lower casting position in which the mould cavity 22 is larger than the volume of the sole layer 18. Accordingly, the material for layer 18 passes into an enlarged mould cavity.

After the introduction of the measured charge of material the bottom plunger 11 is moved upwards from the position according to FIGS. 1 and 2 into the position according to FIG. 3, whereat the bottom plunger abuts its lateral, surrounding collar 24 against an edge face of the counterpiece 14. The mould parts are dimensioned in relation to one another so that a clear joint 25 is formed between the mould plate 23 of the counterpiece 14 and the collar 24 of the bottom plunger 11. The material of the first sole layer 18 enters this joint 25 in the pressure shaping of the layer, and forms an intentional, thin-walled material expulsion bead 26 in the joint.

The surface of the collar 24 facing the mould plate 23 is provided with a surrounding channel or recess 27. This receives material of the sole layer 18 and thus forms a stabilized bead or flange in the zone of the expelled material.

The desired relative position between bottom plunger 11 and counterpiece 14 is achieved due to the fact than an edge surface or ledge 28 of the collar 24 outside of the channel 27 directly abuts the mould plate 23, while an inner zone 29 is stepped in relation thereto.

The bottom plunger 11 is provided with a recess 30 enclosed by the collar 24, in which the first sole layer 18 is received. Thus, the latter with its side face 20 receives no abutment on the lateral mould parts 12.

After the completion of the first sole layer 18 the lateral mould parts 12 are opened and the mould counterpiece 14 is replaced by the last 13 provided with a shoe upper 10. The last abuts on a surrounding sealing lip 31 of the closed lateral mould parts 12 in a position which provides an enlarged mould cavity 32 for the reception of the material for the second sole layer 19. As soon as a predetermined charge of this material is introduced through the pouring passage 16 into the mould cavity 32, the bottom plunger 11 is moved further upward until its collar 24 abuts on a step 33 formed by the lateral mould parts 12. Between this inwardly protruding step 33 and the collar 24 the material expulsion bead 26 is enclosed, at least in the inner zone. Thus, this material forms a closure for the highly viscous material of the second sole layer 19 in such a way that the material is not able to penetrate into the gap 34 between the first sole layer 18, already completed, and the bottom plunger 11 or the collar 24 thereof. Thus, the second sole layer 19 is cleanly and clearly limited from the first sole layer 18.

The relative position of bottom plunger 11 and lateral mould parts 12 may be dimensioned so that expelled material enters a gap above the bead 26 of the first sole layer 18 during the shaping of the second sole layer 19 as well (FIG. 5). After the withdrawal of the finished shoe from the mould the bead 26 is severed in a simple manner from the lateral surface 20 of the sole 17.

In the embodiment of FIGS. 6 to 9 a two-part sole 35 is produced which consists of a front part 36 and a heel part 37. The front part 36 is drawn up laterally on the shoe. The heel part 37 is shaped with a distinct covering 38 running out with a thin wall or sharp edge towards the shoe toe. The heel part 37 upwardly surrounds the front part 36 with an upper edge 39 and a front cap 40.

In a first casting the front part 36 is moulded in a cavity 41 downwardly limited by a bottom plunger 42 which in its forward part is provided with an upwardly directed collar 43. This collar 43 terminates at the closure of the mould cavity 41. Thus, a recess 44 is produced in the forward zone of the bottom plunger, and is open towards the heel.

The closure of the mould cavity 41 is formed by a mould counterpiece 45 which limits the cavity 41 upwards and in the heel direction by an end wall 46. The counterpiece 45 otherwise extends along the upper contour of the front part 36, which is limited from the heel part 37 along a separation line 47. In the edge zone the mould counterpiece 45 is formed with an approximately horizontally directed flange 48, which the bottom plunger 42 abuts with its collar 43 during the shaping of the front part 36. Accordingly, in the zone between the collar 43 and the flange 48, a material expulsion bead 49 is formed in the moulding of the front part 36.

The inner side of the end wall 46 is flush with the outer side of a groove 50 formed in the bottom plunger 42. As may be seen from FIG. 9, the groove 50 extends along the contour of the front part 36 and of the mould cavity 41. In the embodiment illustrated the groove 50 is outwardly limited by a closure plate 51 which is detachably inserted into the mould counterpiece 45. The closure plate 51 bridges the gap 52 formed between bottom plunger 42 and counterpiece 45, and acts as flow barrier for material of the front part 36. The groove 50 is further provided with a channel 53. Due to the closure plate 51, which is taken out of the mould with the mould counterpiece 45, a joint 54 is formed in the bottom plunger 42 into which expelled material enters during the moulding of the second sole part.

The material for the front part 36 is introduced into the mould cavity 41 by way of a separate pouring passage 55 in the plane of separation of the longitudinally divided mould counterpiece 45. The mouth of passage 55 is arranged so that a casting head can be driven over the free part of the mould into abutment with the passage. At the end facing the mould cavity 41 the passage 55 is provided with a flow barrier, in the present case an externally operable slider 56. This prevents the backflow of material, and limits the dead head formed on the front part 36 of the sole 35 to a relatively short length.

In the region of the mould cavity 41 the bottom plunger 42 is provided with elevated retaining points 57. These secure the front part 36, moulded in the first casting action, in the exact desired position for further work.

A variant of the construction of bottom plunger 42 and mould counterpiece 45 is illustrated in FIG. 7. Here for the reception of the material expulsion bead a wedge-shaped groove 58 is provided in the bottom plunger 42. This is limited on the outside, in the direction towards the end wall 46, by an elastic seal strip 59 of silicone material, for example.

After the completion of the front part 36 the mould counterpiece 45 is replaced by the last 13 provided with a shoe upper 10. This abuts on a surrounding sealing lip 60 formed on longitudinally divided lateral mould parts 61.

For the formation of the front cap 40 from the material of the heel part 37 the lateral mould parts 61 extend to the upper side of the shoe upper 10. A mould cavity 62 for the reception of the material for the heel part 37 is accordingly limited by the bottom plunger 42, the lateral mould parts 61, the last 13 and, due to the covering 38, the front part 36.

With this configuration of the mould a flow barrier is set up at the endangered limit zones from the heel part 37 by material expulsion bead 49, formed by the material of the front part 36. This barrier prevents material of the one sole part from penetrating into the mould cavity of the other sole part. The material for the heel part 37 is introduced into the mould cavity 62 through a pouring passage 63.

In all cases the material expulsion bead 49 formed along the contour of contact or separation line between the sole parts 36 and 37 is removed by a simple severing or cutting operation after withdrawal from the mould. This severing operation is facilitated by the rounded bead formed in the channel 53.

We claim:

1. A mould assembly for making shoe soles in two layers, comprising:
   (a) a plunger member having an upper surface defining the bottom and sides of a mould cavity for a first sole layer and a ledge at least partially surrounding said cavity and extending transversely outwardly from the sides thereof,
   (b) a recessed channel defined in and extending along said ledge, said channel extending into and communicating with said cavity, and
   (c) a counterpiece member disposed above the plunger member and having a lower surface defining the top of the mould cavity for the first layer, said lower surface matingly engaging said plunger member ledge when said plunger and counterpiece members are brought together, whereby an outwardly extending flange is moulded around the upper edge of the first sole layer and serves to prevent the incursion of the material of the second sole layer into the lateral side faces of the first sole layer during the subsequent moulding of the second sole layer, said flange being thereafter removed to define a clean junction line between the first and second sole layers.

2. A mould according to claim 1, characterized in that a groove is defined in the upper surface of the plunger member defining the cavity bottom in the vicinity of a junction line between the two sole layers to form a material expulsion bead.

3. A mould according to claim 2, characterized in that for shaping a toe portion of the first sole layer the cavity is closed off by an end wall of the counterpiece member which engages the surface of the plunger member adjacent the groove therein.

4. A mould according to claim 3, characterized in that the inner side of the end wall is flush with the groove in the plunger member.

5. A mould according to claim 3, characterized in that the cavity for the toe portion is sealed off by a separate seal element in the vicinity of the engagement between the counterpiece member end wall and the plunger member.

6. A mould according to claim 5, characterized in that the seal element comprises a closure plate fitted on the counterpiece member, said plate adapted to enter the correspondingly dimensioned groove in the plunger member.

7. A mould according to claim 5, characterized in that an elastic seal strip is fitted on the counterpiece member end wall and rests on the plunger member with its inner side flush with the outer side of the groove.

8. A mould according to claim 7, characterized in that the counterpiece member has a separate pouring passage for the production of the toe portion.

9. A mould as defined in claim 1, wherein the recessed channel comprises a shallow inner portion in communication with the cavity and a deeper outer portion, whereby the moulded flange comprises an outer bead portion joined to the first sole layer by a connecting web portion.

10. A mould as defined in claim 1, further comprising a pair of separable lateral mould members defining, when joined together, a central passage extending therethrough having a cross-sectional shape approximating that of a shoe sole, the plunger member being slidably inserted from the bottom of the passage and the counterpiece member being disposed in the passage above the plunger member.

11. A mould as defined in claim 10, wherein said lateral mould members have an inwardly stepped shoulder adapted to matingly engage said plunger member ledge during the moulding of the second sole layer.

* * * * *